United States Patent [19]

Hatch et al.

[11] Patent Number: 5,028,674

[45] Date of Patent: Jul. 2, 1991

[54] METHANOL COPOLYMERIZATION OF ETHYLENE

[75] Inventors: Paul B. Hatch; Donald R. Marshall, both of Orange, Tex.

[73] Assignee: E. I. Du Pont de Nemours and Company, Wilmington, Del.

[21] Appl. No.: 533,826

[22] Filed: Jun. 6, 1990

[51] Int. Cl.$^5$ .................. C08F 2/00; C08F 20/10; C08G 85/00
[52] U.S. Cl. ............................ 526/216; 526/62; 526/328
[58] Field of Search ........................ 526/216

[56] References Cited

U.S. PATENT DOCUMENTS 4,252,924 2/1981 Chatterjee ..................... 526/65

OTHER PUBLICATIONS

H. F. Mark, N. M. Bikales, C. G. Overberger, and G. Menges; Encyclopedia of Polymer Science and Engineering, vol. 6, pp. 400–402, 1986 (John Wiley & Sons).

Primary Examiner—Joseph L. Schofer
Assistant Examiner—Wu C. Cheng

[57] ABSTRACT

An improvement in the process for the continuous copolymerization of ethylene with certain polar comonomers having reactive double bonds, wherein a single phase is maintained in the reactor by means of methanol introduced concurrently with the reactants, whereby reactor fouling is significantly reduced or eliminated.

7 Claims, No Drawings

METHANOL COPOLYMERIZATION OF ETHYLENE

BACKGROUND OF THE INVENTION

Continuous copolymarization of ethylene with other comonomers is well known in the art. Two types of reactors which are widely used are tubular reactors and stirred tank reactors. Such reactors are quite different in their dimensions, and hence in the environment and state of motion of the reacting mixture. The nature of polymers made from these different types of reactors is described in Armitage, U.S. Pat. No. 4,351,931 for ethylene-methacrylic acid copolymers, which is hereby incorporated by reference.

For the production of random uniform copolymers in a continuous stirred tank reactor, it is desirable to keep the polymerizing mixture in one phase. Increasing the temperature and/or pressure for any monomer mix will decrease the likelihood of separating the mix into two phases. However, when the copolymerization is carried out in internally stirred reactors, the highly polar comonomers result in build up of polymer deposits on the inner surfaces of the reactor far more readily than with non-polar monomers, and at temperatures and pressures at which little or no deposits would occur with non-polar monomers. These deposits may be related to localized phase separation in localized colder regions of the polymerization kettle, such as the monomer inlet region or stirrer seal region.

The formation of these deposits adversely affects the stable operation of the reactor. In addition, with the passage of time, the deposits thermally crosslink to form an intractable gel. As gel particles subsequently are released from the reactor surfaces by the combined action of the shear of the stirrer and the flow of monomers through the vessel, the presence of those cross-linked particles in the copolymer tends to compromise the quality of the copolymer produced.

Comonomers with reactivities substantially equivalent to ethylene, such as vinyl acetate, normally will not exhibit this effect. There, the relative proportion of each monomer incorporated into the polymer is similar to that of the monomer mix. In a continuous reactor operating under steady conditions, this means the composition of the monomer mix will be similar to that of monomers polymerized into the polymer. The polarity of the polymer will tend to be similar to that of the monomer mix, which substantially reduces the likelihood of reactor fouling.

Various methods have been proposed to solve the problem of reactor fouling, including periodic reactor scraping or the addition of an adhesion inhibitor. However, none of the solutions previously suggested provides the desired combination of high production rates and the applicability to comonomers having significantly different rates of reaction.

A need therefore exists for a process for the copolymerization of ethylene with highly reactive comonomers in which a single phase is maintained in the reactor, with the result that polymer separation or deposition on the inner parts of reactor vessel is prevented.

SUMMARY OF THE INVENTION

According to the present invention, there is provided, in a process for the continuous copolymerization of ethylene with at least about 2 weight percent of at least one comonomer selected from the group consisting of (a) alpha-beta unsaturated carboxylic acids having 3 to 8 carbon atoms, (b) esters and glycidyl esters of the above (a) acids with $C_1$-$C_8$ alcohols and with phenols and naphthols having up to 2 alkyl substituents of 1-4 carbon atoms, and (c) anhydrides of the above (a) acids, and the resulting copolymer contains about 15-98 weight percent of copolymerized ethylene, wherein the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes, and recovering the copolymer from the reactor effluent, the improvement which comprises concurrently introducing into the copolymerization reactor a solvent consisting essentially of methanol in an amount of about 2-25 weight percent of the total material flowing through the reactor.

DETAILED DESCRIPTION OF THE INVENTION

In accordance with the present invention ethylene is copolymerized with at least one comonomer. As used herein, the term "copolymerization" means reaction with one or more comonomers to give dipolymers, terpolymers and the like. The process of the present invention is particularly applicable to the preparation of copolymers containing 30-95 weight percent of ethylene.

The comonomers with which the ethylene is copolymerized are selected from (a) alpha-beta unsaturated carboxylic acids having 3 to 8 carbon atoms, (b) esters and glycidyl esters of the above (a) acids with $C_1$-$C_8$ alcohols and with phenols and naphthols having up to 2 alkyl substituents of 1-4 carbon atoms, and (c) anhydrides of the above (a) acids.

Representative of these comonomers are alpha-beta unsaturated carboxylic acids having 3-8 carbon atoms, such as methacrylic acid, acrylic acid, maleic acid, fumaric acid and itaconic acid; esters and glycidyl esters of the above acids with $C_1$-$C_8$ alcohols and with phenols and naphthols having up to 2 alkyl substituents of 1-4 carbon atoms, such as methyl acrylate, ethyl acrylate, methyl methacrylate, ethyl methacrylate, butyl acrylate, isobutyl acrylate, pentyl acrylate, hexyl acrylate, 2-ethylhexyl acrylate, 2-ethylhexyl methacrylate, glycidyl methacrylate, phenyl acrylate, 4-methylphenyl acrylate, naphthyl acrylate, methyl hydrogen maleate, ethyl hydrogen maleate, and ethyl hydrogen itaconate; and anhydrides of the above acids, such as maleic anhydride, acrylonitrile, and methacrylonitrile.

Some of the preferred ethylene copolymers that can be prepared by this process include, for example, ethylene/methacrylic acid, ethylene/acrylic acid, ethylene/methyl methacrylate, ethylene/isobutyl acrylate, ethylene/methyl methacrylate/methacrylic acid, ethylene/butyl acrylate/glycidyl methacrylate, and ethylene/methyl acrylate/ethyl hydrogen maleate copolymers.

The monomers to be copolymerized are typically introduced into the copolymerization reactor with at least one free-radical copolymerization initiator, according to known copolymerization techniques. Typical copolymerization initiators which can be used include peroxygen compounds such as lauryl peroxide, tert-butyl peracetate, tert-butyl peroxypivalate, di-tert-butyl peroxide, di(sec-butyl) peroxydicarbonate, as well as tert-butyl peroctoate. Other free radical initiators which can be used include azobis compounds such as, e.g. azobisisobutyronitrile. The choice of initiator will depend on the copolymerization temperature since each initiator has its own decomposition temperature, at which it efficiently generates free radicals. In general, the initiator is present in an amount of about from 0.0001 to 0.1 moles per 1000 pounds of polymer products.

The copolymerization temperature is generally maintained at about from 120° C. to 300° C., and preferably about from 140° C. to 260° C. The pressure is generally maintained at about from 130 to 310 MPa, and preferably within the range of about 165 to 200 MPa.

A central feature of the present invention is the use of methanol as a solvent in the reaction. The methanol is present in an amount equal to about 2–25 percent by weight of the total material flowing through the reactor. Above about 25 weight percent of the solvent system in the materials flowing through the reactor, the monomer fraction of the reactor content can become diluted to the point that both the copolymerization rate and the molecular weight of the resulting copolymer would be adversely affected. Below about 2%, the methanol solvent often is not effective. Preferably, at least about 5 weight percent of the methanol is present to provide improved anti-fouling characteristics, and, in general, an amount equal to about 5–20 weight percent of the total material flowing through the reactor is preferred. While other solvent components can be present in the present process, they should not be of a character or present in an amount which substantially depreciates the basic performance of the methanol in its role in reducing fouling in the reaction.

The methanol solvent used in the present process can be used alone or in combination with other solvents, which may also function as chain transfer agents. Methanol is itself telogenic, and can reduce molecular weight significantly. In other cases, depending on the particular monomer and its amount, it may be desirable to add one or more conventional hydrocarbon chain transfer agents such as propane to adjust the molecular weight to the specific end use for which the copolymer is intended.

Some solvents previously used in the art for this type of polymerization can be used in combination with methanol in the instant process without detracting from the non-fouling benefits of the methanol. Such additional solvents include benzene and t-butanol, both of which are substantially non-telogenic. That is, they do not reduce or 'regulate' the molecular weight of the polymer. Chain regulators or telogens often used in copolymerizations with polar monomers include small quantities of cyclohexane or other hydrocarbons such as propane.

The copolymerization is run as a continuous process in which ethylene, the reactive comonomer, and the solvent system are continuously fed, together with initiator, into a stirred reactor, for example, an autoclave of the type disclosed in Christl et al., U.S. Pat. No. 2,897,183, hereby incorporated by reference. The rate of addition will depend on variables such as the polymerization temperature, pressure, monomers employed, and concentration of the monomers in the reaction mixture. The reaction mixture is continuously removed from the autoclave, and, after the reaction mixture leaves the reaction vessel, the resulting copolymer is separated from the volatile unchanged monomers and solvents by conventional means, e.g.,.. by vaporizing the unpolymerized materials and solvents under reduced pressure and at an elevated temperature.

The process of this invention is operated so that a single phase is present in the copolymerization reactor substantially throughout the reactor. Accordingly, the amounts of comonomers and of solvent are adjusted to the type of comonomer or comonomers as well as to the operating conditions such as temperature, pressure, and rate of flow. Generally, the solvent permits the monomers and the copolymer to remain in the same phase in the reactor. The miscibility of those system components depends largely on their polarities and also on the amount of the polar comonomers relative to the amount of ethylene. Thus, for a higher concentration of polar comonomer or for a more polar comonomer, a larger amount of cosolvent may be required.

When the amount of comonomer in the ethylene copolymer is less than about 10% but especially when it is less than about 5%, the difference in polarity of the copolymer and the unchanged monomers is minimized, so that phasing out of the polymer is negligible. The process of this invention is the most useful in the case where the amount of copolymerized ethylene is at least about 30% of the copolymer.

It is known that temperature, pressure and conversion affect the tendency to form a second phase. For example, increasing temperature and pressure help reduce fouling, but increasing temperature increases chain transfer and hence reduces molecular weight. By use of solvents according the present invention, combined with adjustment of these three conditions, reactor fouling can be substantially reduced or prevented with even the most polar and reactive monomers.

Copolymers resulting from the the process of the present invention can be characterized by a broad spectrum of molecular weight.

Those having a low molecular weight, or high melt index, of greater than about 100, can be used as adhesives. In applications for which a higher molecular weight is desired, such copolymers can be modified by a variety of known techniques. For example, acid copolymers, such as ethylene (meth)acrylic acid can be neutralized to form ionomers as discussed in Rees, U.S. Pat. No. 3,264,272, hereby incorporated by reference. Those copolymers not amenable to ionomerization can be lightly branched or crosslinked by known techniques to increase molecular weight to a desired level.

Copolymers having a high molecular weight can be further treated, if desired, to reduce molecular weight by the addition of telogens, as will be evident to those skilled in the art.

The present invention is further illustrated by the following examples, in which parts, proportions, and percentages other than yields or conversions are by weight unless otherwise indicated.

EXAMPLE 1

A 750 ml steel continuous stirred reactor was repeatedly flushed with essentially dry gaseous ethylene of greater than 99.9% purity to remove residual oxygen from the system. The reactor body temperature was then raised to the goal temperature, about 180.C, using external heaters. A mixture consisting of 40% by weight of a non-polar sovent, tert-butyl benzene (TBB), and 60% by weight methanol was continuously pumped at a rate of 0.165 kg/hr through the stirrer seal and into the reactor.

Ethylene, compressed to approximately 186 MPa (1837 atm) and then cooled to 30.C, was continuously metered to the reactor at a rate of 5.45 kg/hr. The flow of ethylene was used to establish the reactor pressure at about 186 MPa (1837 atm). Propane, added as a chain transfer agent, was pumped to the reactor at a rate of about 0.39 kg/hr.

The cool ethylene and solvent feeds lowered the temperature of the reactor contents below the desired temperature of 180.C. An initiator solution consisting of about 0.57% tert-butyl peroctoate in a non-polar solvent tert-butyl benzene was maintained in a separate reservoir and pumped to the reactor at a temperature of about 30.C. Once polymerization was initiated, as evidenced by an increase in the internal reactor temperature, a solution consisting of 67 wt% methacrylic acid and 33 wt % methanol at a temperature of 30° C. was pumped into the reactor at a rate of 0.286 kg/hr. The polymer produced contained 30% by weight of methacrylic acid.

The total concentration of polar solvent (methanol) in the reactor, from the stirrer seal flush and methacrylic acid solution was 3.5% by weight, the flow of the initiator was increased to raise the reactor internal temperature to 180° C. The reactor internal temperature was maintained by adjusting the initiator solution flow. The internal reactor temperature spread averaged 1.C. The reactor internal temperature spread is defined as the maximum difference between the temperatures indicated by four thermocouples equally spaced internally along the longitudinal direction of the reactor. Polymerization continued and steady state operation was obtained after about 3 hours. The system was maintained at steady state operation for 12 hours. At the end of that period the reaction was terminated, the reactor disassembled and examined for fouling by polymer deposits. None were found.

The ratio of ethylene to methacrylic acid in the feed was about 28.4 to 1. The polymer production rate at steady state was about 0.48 kg/hr. Conversion of the methacrylic acid was approximately 75%. Ethylene conversion was about 6.2%. Overall conversion of monomers to polymer was about 8.5%. The relative reactivity of methacrylic acid to ethylene as measured by the conversion ratios of these monomers was 12.1. The copolymer, unchanged monomer, solvent, and impurities were continuously removed from the reactor. The copolymer was separated from the gaseous components by reducing the exit stream pressure from about 186 MPa to atmospheric pressure across a high pressure valve. The off-gas contained ethylene and methacrylic acid along with methanol as well as trace amounts of initiator and other normal impurities. The copolymer, containing small amounts of unchanged monomer, solvent, and other normal impurities, was collected and allowed to cool.

The resulting ethylene/methacrylic acid copolymer was a hard, clear, colorless, high molecular weight material. Incorporated methacrylic acid in the copolymer was approximately 30% of total copolymer weight. Carboxylic group concentration in the copolymer was determined by titration of copolymer solution in a 75:15:10 mixture of xylene-butyl alcohol-propylene glycol with a methanol solution of tetramethylammonium hydroxide. The ethylene/methacrylic acid copolymer had a melt index of 1.5 dg/min as determined by the appropriate procedure in ASTM D-1238.

COMPARATIVE EXAMPLES A AND B

Using the apparatus and general procedure described in Example 1, additional ethylene/methacrylic acid copolymers were produced using a feed designed to produce polymer with approximately 30% of methacrylic acid, as shown in Table I below. No methanol solvent was used in Comparative Example A, and tert-butyl alcohol was used in Comparative Example B.

TABLE I

| Example | A | B |
|---|---|---|
| Temperature, °C. | 180 | 185 |
| Pressure, MPa | 186 | 186 |
| Ethylene, kg/hr | 5.45 | 5.45 |
| Methacrylic acid, kg/hr | 0.09 | 0.29 |
| Total methanol, kg/hr | — | — |
| Total tert-butyl alcohol, kg/hr | — | 1.16 |
| Total polar solvent, % | 0 | 15.4 |
| Total tert-butyl benzene, kg/hr | 0.95 | 0.62 |
| Initiator, tert-butyl peroctoate | | |
| Concentration, % | 0.16 | 0.20 |
| Solution rate, kg/hr | 0.19 | 0.29 |
| Yield, kg/hr | 0.40 | 0.74 |
| Copolymer melt index, dg/min | 1. | 41 |
| Methacrylic acid conversion, % | 80 | 77 |
| Run time, | | |
| Total, hours | 19 | 12 |
| Steady state, hours | 0 | 12 |
| Avg. reactor temperature spread, °C. | 4 | 3 |
| Reactor adhesions, mm thickness | 1.6-3.2 film | 1.6-3.2 film |

In Comparative Example A, it was not possible to obtain steady state operation, in the absence of solvent. Methacrylic acid content in the polymer varied from 13 to 36.4 wt%. In Comparative Example B, in which tert-butyl alcohol was used as solvent, despite a 5° higher temperature, which tends to decrease adhesions, it was not possible to avoid them, though a steady state was achieved. A significant degree of reactor fouling was indicated by the adhesions of between 1.6 and 3.2 mm.

EXAMPLES 2 and 3 AND COMPARATIVE EXAMPLE C

Using the apparatus and general procedure of Example 1, ethylene/methacrylic acid copolymers were produced with a methacrylic acid content of between 5 and 6 wt.%. The reaction conditions and results are summarized in Table II below.

TABLE II

| Example | C | 2 | 3 |
|---|---|---|---|
| Temperature, °C. | 180 | 180 | 180 |
| Pressure, MPa | 186 | 186 | 196 |
| Ethylene, kg/hr | 6.36 | 6.36 | 6.36 |
| Methacrylic Acid kg/hr. | 0.055 | 0.050 | 0.050 |
| Total methanol, kg/hr | — | 0.55 | 0.19 |
| Total tert-butyl benzene, kg/hr | 0.70 | 0.52 | 0.51 |
| Total polar solvent, wt % | — | 7.4 | 2.5 |
| Propane, telogen, kg/hr. | 0.60 | 0.18 | 0.50 |
| Initiator, (di(sec-butyl)peroxydicarbonate) | | | |
| Demand, kg/1000 kg polymer | 0.455 | 0.366 | 0.314 |
| Yield, kg/hr | 0.62 | 0.54 | 0.44 |

TABLE II-continued

| Example | C | 2 | 3 |
|---|---|---|---|
| Copolymer melt index, dg/min | 1.63 | 1.23 | 1.30 |
| Methacrylic acid in pol. wt %. | 6.08 | 5.80 | 5.90 |
| Run time, Steady state hrs. | 12 | 12 | 12 |
| Average Reactor temperature spread, °C. | 1.6 | 4.8 | 0.75 |
| Reactor adhesions, mm. | 3–6 moderate | <1.6 clean | 1–2 v. light |

In Comparative Example C, although steady state was achieved, considerable fouling occured, even at relatively low methacrylic acid content. In Example 2, this fouling was substantially eliminated through the addition of methanol in accordance with the instant invention. In Example 3, fouling was reduced to a low level with a combination of less methanol and higher pressure.

EXAMPLE 4 AND COMPARATIVE EXAMPLES D AND E

Using the apparatus and general procedure described in Example 1, ethylene/methyl acrylate/ethyl hydrogen maleate terpolymers containing approximately 55 weight percent methyl acrylate and approximately 4 weight percent ethyl hydrogen maleate were produced. The reaction conditions and results are summarized in Table III below.

TABLE III

| Example | D | E | 4 |
|---|---|---|---|
| Temperature, °C. | 165 | 166 | 165 |
| Pressure, MP | 186 | 186 | 186 |
| Ethylene, kg/hr | 5.45 | 5.45 | 5.45 |
| Methylacrylate, kg/hr | 1.02 | 0.83 | 0.98 |
| Ethyl hydrogen maleate, kg/hr | 0.04 | 0.037 | 0.04 |
| Total methanol, kg/hr | — | 0.8 | 1.11 |
| Total tert-butyl alcohol, kg/hr | — | 1.2 | — |
| Total tert-butyl benzene, kg/hr | 1.32 | — | 0.14 |
| Total alcohol solvent, % | 0.0 | 24 | 14.4 |
| Chain transfer agent, Propane Rate, kg/hr | 1.0 | — | — |
| Initiator, di(sec-butyl) peroxydicarbonate | | | |
| Concentration, % | 0.24 | 0.14 | 0.19 |
| Solution rate, kg/hr | 0.37 | 0.23 | 0.12 |
| Yield, kg/hr | 0.96 | 0.83 | 0.75 |
| Copolymer melt index, dg/min | 161 | 91 | 91 |
| Methyl acrylate conversion, % | 50 | 54 | 43 |
| Ethyl hydrogen maleate conversion, % | 73 | 100 | 98 |
| Run time, | | | |
| Total, hours | 17 | 13 | |
| Steady state, hours | 10 | 12 | 10 |
| Average Reactor temperature spread, °C. | 3 | 1 | 1 |
| Reactor adhesions, mm. | severe adhesion | 1.6–3.2 film | None |

In Comparative Example D, adhesion to the inner parts of the reactor was unacceptable. In Comparative Example E, in spite of the use of methanol solvent of the present invention, some adhesion still occurred. The additional presence of tert-butanol to give a very high total level of solvent did not help. In Example 4, however, an increased level of methanol, but much lower total solvent, was capable of eliminating adhesions completely. The total amount of polar comonomers in the copolymer was high (59%) in these cases, and the corresponding methanol requirement is also high, which, in turn, results in a high melt index. The resulting polymer can be beneficially used as a base for an elastomer.

EXAMPLE 5 AND COMPARATIVE EXAMPLES F-H

Using the apparatus and general procedure described in Example 1, ethylene/methyl acrylate/ethyl hydrogen maleate terpolymers were produced. The reaction conditions and results are summarized in Table IV below.

TABLE IV

| Example | F | G | H | 5 |
|---|---|---|---|---|
| Temperature, deg. C. | 165 | 165 | 165 | 165 |
| Pressure, MPa | 186 | 186 | 186 | 200 |
| Ethylene, kg/hr | 5.45 | 5.45 | 5.45 | 5.45 |
| Methyl Acrylate, kg/hr | 0.82 | 0.71 | 0.86 | 0.80 |
| Ethyl Hydrogen Maleate kg/hr | 0.045 | 0.036 | 0.055 | 0.036 |
| Total alcohol, kg/hr | 1.23 | 1.24 | 1.81 | 0.37 |
| Alcohol type | EtOH | iPrOH | MeOH | MeOH |
| Total tert-butyl benzene kg/hr | 0.59 | 0.75 | 0.70 | 0.37 |
| Initiator Demand di(sec-butyl) peroxydicarbonate | | | | |
| kg/1000 kg polymer | 0.395 | 0.568 | 0.557 | 0.162 |
| Yield, kg/hr | 0.78 | 0.82 | 0.84 | 0.65 |
| Melt Index, dg/min | 640 | 1760 | 438 | 29.7 |
| Polymer Comp. wt. % | | | | |
| Methyl Acrylate | 56 | 56 | 56.5 | 57.8 |
| Ethyl Hydrogen Maleate | 5.0 | 4.1 | 5.7 | 4.7 |
| Steady State time hrs. | 12 | 12 | 12 | 12 |
| Avg. Reactor Temp. Spread, deg. C. | 2.4 | 4.4. | 5.5 | 4.5 |
| Reactor Adhesions, mm. | None | 1.6–2.4 film | 1.6–2.4 film | 1.6–2.4 film. |

COMPARATIVE EXAMPLES J AND I AND EXAMPLE 6

Using the apparatus and general procedure described in Example 1, ethylene/methyl acrylate copolymers were produced. The reaction conditions and results are summarized in Table V below.

TABLE V

| Example | I | J | 6 |
|---|---|---|---|
| Temperature, deg. C. | 227 | 165 | 176 |
| Pressure, MPa | 186 | 186 | 186 |
| Ethylene, kg/hr | 6.36 | 3.64 | 6.36 |
| Methyl Acrylate, kg/hr | 0.24 | 0.55 | 0.19 |
| Total methanol, kg/hr | 0 | 1.13 | 0.77 |
| Total t-butyl benzene, kg/hr | 0.32 | 0.42 | 0.31 |
| Total polar solvent, wt % | 0 | 19.7 | 10.1 |
| Initiator Demand kg/1000 kg polymer | 0.023 | | |
| t-butyl peroctoate | | | |
| di(sec-butyl) peroxydicarbonate | | 0.405 | 0.354 |
| Yield, kg/hr | 0.64 | 0.42 | 0.58 |
| Copolymer melt index, dg/,om | 3.95 | 285 | 8.9 |
| Polymer Composition: | | | |
| Wt % Methyl Acrylate | 20.3 | 60.6 | 19.0 |
| Steady state run time, hrs | 12 | 12 | 12 |
| Avg. reactor t. spread, deg. C. | 2.3 | 0 | 1.1 |
| Reactor Adhesions, mm. thick | >6.4 Heavy | <1.6 Clean | <1.6 Clean |

Comparative Example I shows that without methanol solvent, high temperature does not eliminate fouling for this polymer composition at the usual operating pressure of 186 MPa. Comparative Example J shows that when a very high level of polar monomer is required in the polymer (60% in this case), a large amount of methanol, 20%, is required to eliminate fouling. However, here the telogenic effect of methanol leads to a low viscosity or high melt index. For polymers which are not very amenable to upgrading or crosslinking to an elastomer, such a melt index would provide utility only where low viscosity could be utilized, as for some adhesive uses. Example 6, on the other hand, with only 19% methyl acrylate, required only 10% methanol to avoid fouling, and provided a resin with a melt index widely suitable for a greater range of uses. Comparison with example 1 shows that different comonomers require different levels of methanol to avoid coagulation. In that example, 3.5 wt% was adequate for a 30 wt% MAA copolymer, while here 10.1% was required for a 19 wt% MA copolymer at the same pressure, though the temperature was lower in the present example.

We claim:

1. In a process for the continuous copolymerization of ethylene with at least about 2 weight percent of at least one comonomer selected from the group consisting of
   (a) alpha-beta unsaturated carboxylic acids having 3 to 8 carbon atoms,
   (b) esters and glycidyl esters of the above (a) acids with $C_1 C_8$ alcohols and with phenols and naphthols which may have up to 0-2 alkyl substituents of 1-4 carbon atoms, and
   (c) anhydrides of the above (a) acids, wherein the resulting copolymer contains about 15-98 weight percent of copolymerized ethylene, wherein the monomers and a free-radical initiator are continuously introduced into a stirred copolymerization reactor maintained at a temperature of about from 120° C. to 300° C. at a rate such that the residence time of the material flowing through the reactor is about 10 seconds to 5 minutes, and recovering the copolymer from the reactor effluent,
   the improvement which comprises concurrently introducing into the copolymerization reactor a solvent consisting essentially of methanol in an amount of about 2-25 weight percent of the total material flowing through the reactor.

2. A process of claim 1 wherein the amount of the solvent is about 5-20 weight percent of the total material flow.

3. A process of claim 1 wherein the copolymerization reactor maintained at a temperature of about from 140° C. to 260° C.

4. A process of claim 1 wherein the free-radical initiator is present in an amount of about from 0.0001 to 0.1 moles per 1000 pounds of resultinng copolymer.

5. A process of claim 1 wherein the amount of ethylene in the copolymer is about 30-95 weight percent.

6. A process of claim 1 wherein the copolymerization reactor maintained at a pressure of from about 130 to 310 MPa.

7. A process of claim 6 wherein the copolymerizationn reactor maintained at a pressure of about from 165 to 200 MPa.

* * * * *